US005593171A

United States Patent [19]
Shields

[11] Patent Number: 5,593,171
[45] Date of Patent: Jan. 14, 1997

[54] TRAILER HITCH

[76] Inventor: Samuel Shields, Box 43, Colchester, Ill. 62326

[21] Appl. No.: 437,648

[22] Filed: May 9, 1995

[51] Int. Cl.⁶ ..................................................... B60D 1/40
[52] U.S. Cl. ....................................................... 280/479.2
[58] Field of Search ............................... 280/477, 478.1, 280/479.2, 479.3, 491.5

[56] References Cited

U.S. PATENT DOCUMENTS

| | | | |
|---|---|---|---|
| 3,860,267 | 1/1975 | Lyons .................................... | 280/479.3 |
| 3,912,119 | 10/1975 | Hill et al. .............................. | 280/479.2 |
| 4,114,921 | 9/1978 | Thorell et al. ......................... | 280/479.3 |
| 4,515,387 | 5/1985 | Schuck .................................. | 280/479.3 |
| 4,951,957 | 8/1990 | Gullickson ......................... | 280/479.3 X |
| 5,195,796 | 3/1993 | Williams, Jr. ......................... | 280/478.1 |
| 5,288,096 | 2/1994 | Degelman ......................... | 280/479.3 X |
| 5,342,076 | 8/1994 | Swindall ........................... | 280/479.3 X |

OTHER PUBLICATIONS

Cinch Hitch, Product Literature, The Universal Trailer Guide, TRS Products (Date Unknown).

PullRite Hitch, Product Literature, Mfg. by Pullman Enterprises, Inc. (Date Unknown).

"Towing", Product Literature, (Date Unknown).

*Primary Examiner*—Kevin Hurley

[57] ABSTRACT

An improved trailer hitch is described which facilitates hitching of a trailer to a towing vehicle, and more particularly a trailer hitch is described which permits repositioning of the hitching ball to facilitate alignment with the hitching mechanism. The trailer hitch includes (i) a draw bar having a first end dimensioned and configured for receipt in a hitch receiver, the draw bar defining a longitudinal axis and including at least one pin-receiving aperture formed therein, (ii) at least one plate movably mounted with respect to the draw bar, the plate including a locking aperture and a longitudinal slot, (iii) an upwardly extending hitching ball mounted to the plate, (iv) a tranverse member fixedly mounted with respect to the draw bar and extending through the longitudinal slot, and (v) a locking pin removably received by the pin-receiving aperture in the draw bar and the locking aperture in the plate.

10 Claims, 3 Drawing Sheets

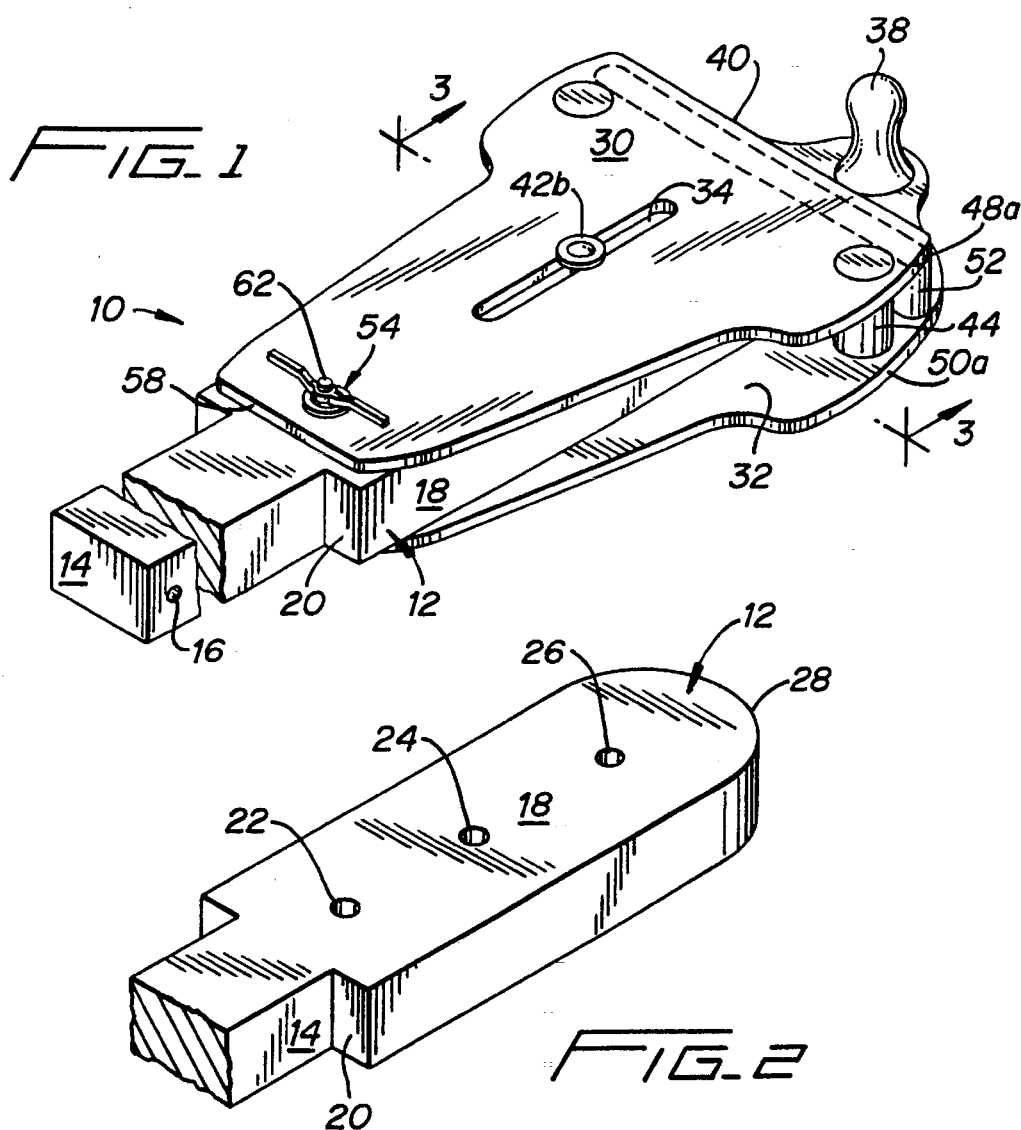
FIG. 1
FIG. 2
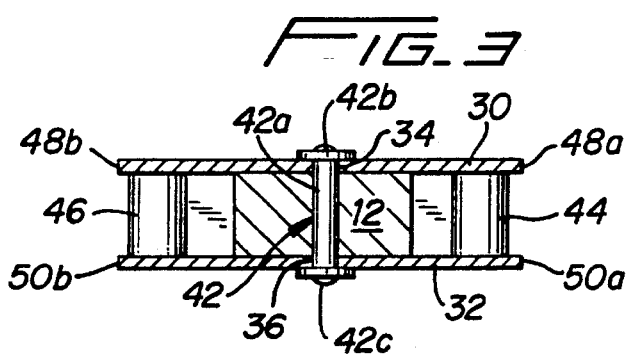
FIG. 3

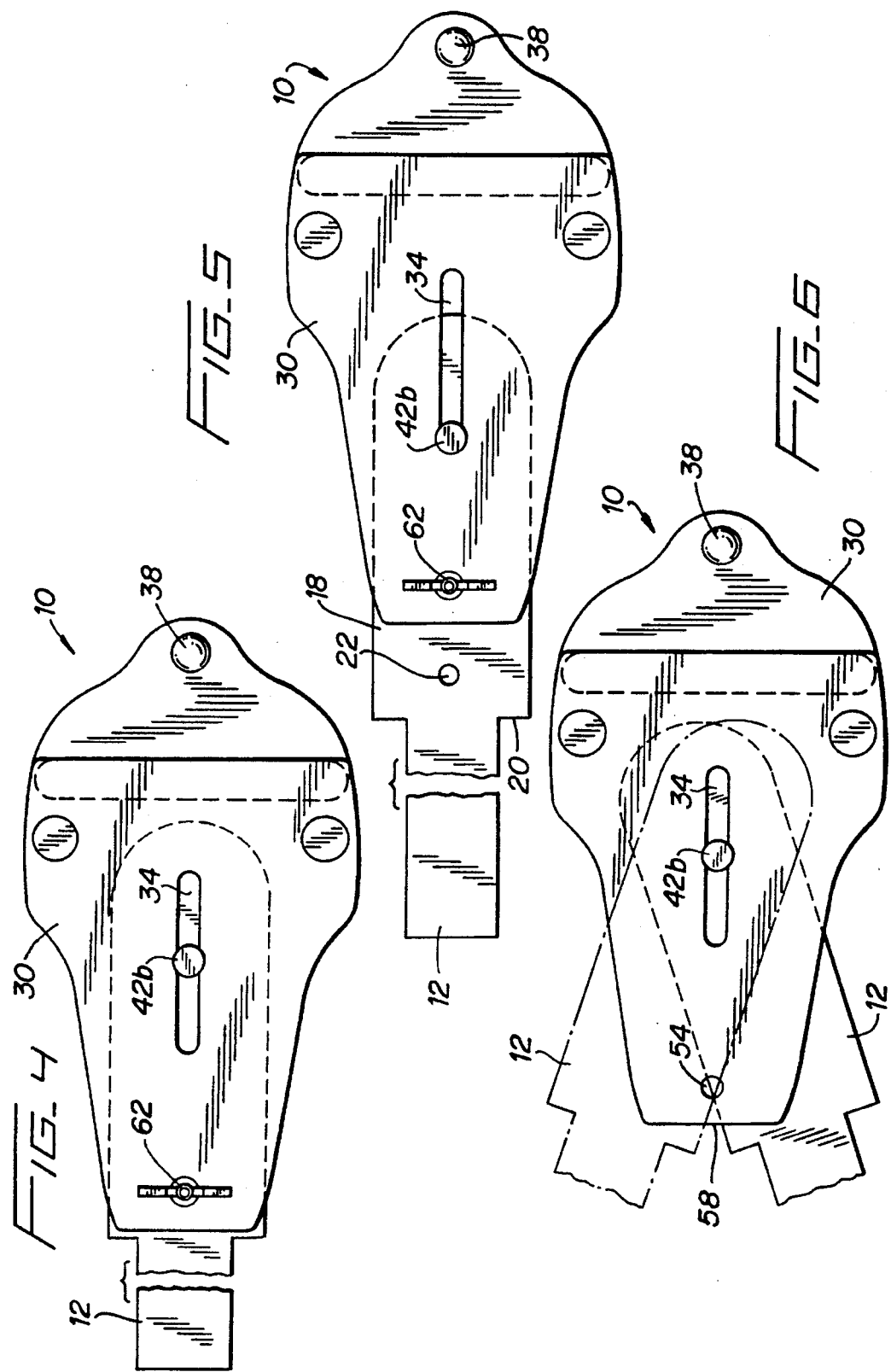

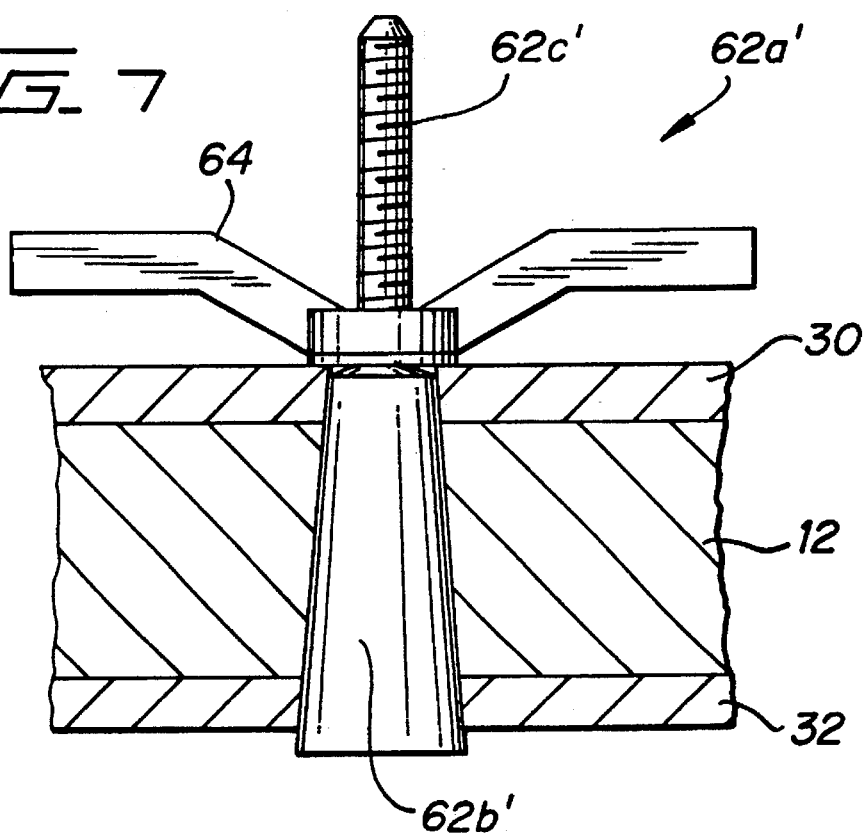
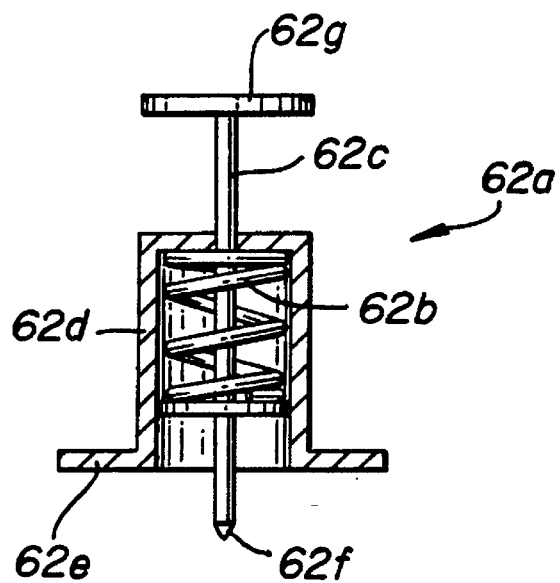

TRAILER HITCH

TECHNICAL FIELD

An improved trailer hitch is described which facilitates hitching of a trailer to a towing vehicle, and more particularly a trailer hitch is described which permits repositioning of the hitching ball to facilitate alignment with the hitching mechanism.

DESCRIPTION OF THE RELATED ART

The use of trailer hitches to detachably mount a trailer to a towing vehicle is well known. Typical trailer hitch systems include an upwardly extending ball on a draw bar which is mounted to and extends from the rear of the towing vehicle and a hitching mechanism mounted to and extending from the front of the trailer which is adapted to grip the ball. The hitching mechanism typically includes a ball receiving cavity which is adapted to receive the ball and to thereby detachably mount the trailer with respect to the towing vehicle.

In use, the towing vehicle is typically backed toward the trailer so as to align the ball with the ball receiving cavity of the hitching mechanism. Relatively precise alignment of the ball with the ball receiving cavity is required to allow detachable coupling thereof. Achieving the required alignment is challenging and difficult because, inter alia., visibility for the driver is limited. The ball and ball receiving cavity define a ball joint which permits rotation of the hitching mechanism with respect to the ball. This ball joint allows the trailer to pivot with respect to the towing vehicle, thereby permitting the towing vehicle to better negotiate turns.

A modified trailer hitch system is offered commercially by Pulliam Enterprises (Mishawaka, Indiana) under the name "PullRite." The PullRite system includes an arcuate radius bar mounted to the undercarriage of the towing vehicle, a draw bar to which the ball is mounted, and roller bearings mounted to the draw bar intermediate the point at which the draw bar is fixedly mounted to the towing vehicle and the ball. The roller bearings are adapted to ride along the radius bar as the towing vehicle negotiates a turn, thereby permitting displacement of the hitching mechanism leftward and rightward with respect to the centerline of the towing vehicle. Thus, the PullRite system allows a shorter turning radius for the towing vehicle/trailer combination by allowing the draw bar to pivot with respect to the towing vehicle.

Another commercial trailer hitch system, the "Cinch Hitch," is available from TRS Products. The Cinch Hitch includes a pair of angularly oriented guide walls surrounding the ball to guide the hitching mechanism into alignment with the ball. A pin is positioned behind the ball which maintains the guide walls in an elevated orientation to guide the hitching mechanism, and release automatically when the hook-up is complete so that functioning of the ball joint is unimpeded. Promotional literature for the Cinch Hitch state that the guide walls serve to increase the target area for aligning the hitching mechanism with the ball from 2 inches to 11 inches, prevents costly damage to plates and bumpers, and guides trailer even at severe back-up angles.

Despite these commercially available trailer hitch systems, a need remains for a trailer hitch system that allows easier alignment of the ball with the hitching mechanism.

SUMMARY

A trailer hitch system is provided which facilitates alignment of the ball with the hitching mechanism. The system includes (i) a draw bar having a first end dimensioned and configured for receipt in a hitch receiver, the draw bar defining a longitudinal axis and including at least one pin-receiving aperture formed therein, (ii) at least one plate movably mounted with respect to the draw bar, the plate including a locking aperture and a longitudinal slot, (iii) an upwardly extending hitching ball mounted to the plate, (iv) a tranverse member fixedly mounted with respect to the draw bar and extending through the longitudinal slot, and (v) a locking pin removably received by the pin-receiving aperture in the draw bar and the locking aperture in the plate.

Alignment of the upwardly extending ball with a hitching mechanism is facilitated by removing the locking pin from, at a minimum, the locking aperture of the draw bar. With the locking pin removed, the plate has two freedoms of movement with respect to the draw bar. First, the plate is free to pivot with respect to the draw bar, thereby permitting the upwardly extending ball to move leftward and rightward with respect to the longitudinal axis of the draw bar. Second, the plate is free to move forward and rearward with respect to the draw bar, such motion being limited only by the length of the longitudinal slot formed in the plate and, accordingly, the distance through which the transverse member is free to travel. Once the hitching mechanism is coupled to the ball, the plate and draw bar are positioned such that the lock pin may be positioned through the pin-receiving aperture and the locking aperture, thereby fixing the plate with respect to the draw bar.

In a preferred embodiment, a second plate is provided of similar, if not identical, geometry to the first on the opposite side of the draw bar. A pair of torsion bars and a solid stabilizing bar extending therebetween preferably join the plates to each other, thereby providing greater stability to the trailer hitch system. The length of the draw bar and the positioning of the torsion bars are preferably selected so that leftward and rightward movement of the plates relative to the draw bar is unimpeded regardless of the forward/rearward position of the plates with respect to the draw bar. In a further preferred embodiment, multiple pin-receiving apertures are provided in the draw bar so that the plate(s) may be be fixed with respect to the draw bar in variable relative longitudinal positions. For example, a first pin-receiving aperture may be provided on the draw bar that will align with the locking aperture when the transverse member is at the midpoint of the longitudinal slot and a second pin-receiving aperture may be provided on the draw bar that will align with the locking aperture when the transverse member is at its proximal-most position in the longitudinal slot. Alternative pin-receiving aperture combinations are of course possible, as will be readily apparent once the advantages of the trailer hitch system are fully appreciated.

BRIEF DESCRIPTION OF THE DRAWINGS

The trailer hitch system will be more readily understood from the description of preferred embodiment(s) which follows, particularly when read in conjunction with the appended figures, in which:

FIG. 1 is a perspective top view of a preferred trailer hitch system;

FIG. 2 is a perspective top view of a draw bar of the trailer hitch system of FIG. 1;

FIG. 3 is a sectional view taken along line 3–3 of FIG. 1;

FIG. 4 is a top plan view of the trailer hitch system with a plate in a first position with respect to the draw bar;

FIG. 5 is a top plan view of the trailer hitch system with the plate in a second position with respect to the draw bar;

FIG. 6 is a top plan view of the trailer hitch system with the plate in two additional positions (one in phantom) with respect to the draw bar;

FIG. 7 is a side view, partially in section, of a preferred locking pin for use fixing the plates with respect to the draw bar; and.

FIG. 8 is a side view, partially in section, of an alternative preferred locking pin for use in fixing the plates with respect to the draw bar.

DESCRIPTION OF PREFERRED EMBODIMENTS

As used herein, the terms "proximal" and "distal" shall refer to directions closer to the towing vehicle and further from the towing vehicle, respectively. Referring to FIG. 1, trailer hitch system 10 includes draw bar 12 which defines a longitudinal axis and which includes a proximal extension 14 of substantially rectangular cross section for receipt in a hitch receiver (not pictured). An aperture 16 is provided in proximal extension 14 to permit the draw bar to be pinned to the hitch receiver. An enlarged body portion 18 extends from proximal extension 14, defining a shoulder 20 which may abut the hitch receiver when the proximal extension is positioned therewithin. With reference to FIG. 2, three apertures extend through body portion 18, namely first pin-receiving aperture 22, second pin-receiving aperture 24, and third pin-receiving aperture 26 positioned distal of first and second pin-receiving apertures 22, 24. Body portion 18 includes a rounded distal end 28 for reasons discussed hereinbelow.

A first plate 30 is movably mounted atop body portion 18 of draw bar 12 and second plate 32 is movably mounted below body portion 18 of draw bar 12. Longitudinal slots 34, 36 are formed in plates 30, 32, respectively, and upwardly extending ball 38 (of conventional design) is positioned adjacent distal face 40 of plate 30. Plates 30, 32 are movably mounted with respect draw bar 12 by transverse member 42 which extends through slots 34, 36. As shown in FIG. 3, transverse member 42 preferably takes the form of a pin 42a which is welded, swaged or in some other way fixed to first and second washers 42b, 42c. Pin 42a is sized to slide within slots 34, 36 with minimal frictional resistance but not with so much clearance that unacceptable play results between draw bar 12 and plates 30, 32 when they are fixed with respect to each other, as described below. Preferably, pin 42a is about 0.75 inches in diameter and washers 42b, 42c are about 2.25 inches in diameter and 0.375 inches in thickness. Still referring to FIG. 1, locking aperture 54 extends through plate 30 adjacent proximal end 58 thereof.

Torsion bar 44 is mounted to plate 30 and plate 32 adjacent edges 48a, 50a thereof, and torsion bar 46 is mounted to plate 30 and plate 32 adjacent edges 48b, 50b thereof. A stabilizing bar 52 is also mounted to plates 30 and 32, extending substantially from edges 48a, 50a to edges 48b, 50b from adjacent torsion bar 44 to adjacent torsion bar 46. In combination, torsion bars 44, 46 and stabilizing bar 52 stabilize trailer hitch system 10 against twist and deformation as the towing vehicle tows a trailer. Preferably, these stabilizing structures are welded to plates 30, 32 to maximize the stabilizing effects thereof, although other means of attachment of attachment may be employed as desired.

A locking pin 62 is removably received through locking apertures 54 provided plates 30, 32 are properly aligned with body portion 18 such that either first aperture 22 or second aperture 24 permit passage of locking pin 62 therethrough. Various geometries and features may be utilized as part of locking pin. For example, as shown in FIG. 8, a spring-loaded locking pin 62a may be employed to assist in positioning the locking pin through the three aligned apertures. Locking pin 62a includes a compression spring 62b mounted to elongated pin body 62c and to housing 62d which includes a circumferential flange 62e. Compression spring 62b biases the tapered end 62f of pin body 62c beyond circumferential flange 62e so that, with circumferential flange 62e in abutting relation with plate 30 and tapered end 62f within locking aperture 54, a constant downward force is applied to pin body 62c as first or second locking aperture 22, 24 of body portion 18 is brought into alignment therewith. Handle 62g facilitates withdrawal of pin body 62c from its locking position.

An alternative locking pin 62a' is shown in FIG. 7. Locking pin 62a' includes a tapered body portion 62b' and a threaded extension portion 62c' extending therefrom. Threaded portion 62c' is adapted to cooperate with nut 64 to secure locking pin 62a' within locking apertures 54, 56 and first aperture 22. An alternative nut 64a is depicted in FIG. 8a which includes an elongated body 64b which defines a threaded cavity 64c for receipt of threaded extension portion 62c'. Outwardly extending arms 64d facilitate rotation of nut 64a for threding onto locking pin 62a'.

Referring to FIGS. 4–6, advantageous features of trailer hitch system 10 will now be described in greater detail. Inasmuch as FIGS. 4–6 are top views of hitch system 10, lower plate 32 is not viewed. In discussing the movements of top plate 30, it is to be understood that lower plate 32 travels in a corresponding manner to top plate 30 by reason of the fixed attachments therebetween, namely the attachments of torsion bars 44, 46 and stabilizing bar 52.

As shown in FIG. 4, plate 30 is in longitudinal alignment with draw bar 12. Locking pin 62 extends through locking aperture 54 and through first aperture 22 in body portion 18 and a further locking aperture (not pictured) in lower plate 32. Transverse member 42 extends through slot 34 and third aperture 26. The combination of locking pin 62 and transverse member 42 serve to fix plate 30 with respect to draw bar 12. As a result, ball 38 is both aligned and fixed with respect to proximal extension 16 of draw bar 12.

Referring to FIG. 5, locking pin 62 has been removed from locking apertures 54 and first aperture 22, thereby freeing plate 30 for relative movement with respect to draw bar 12. As shown, plate 30 has moved longitudinally with respect to draw bar 12, but remained in longitudinal alignment therewith. Locking pin 62 has been reinserted through locking aperture 54 and second aperture 24, thereby again fixing plates 30, 32 relative to draw bar 12. Distal travel of plate 30 relative to draw bar 12 is yhus depicted at its maximum point as a result of transverse member reaching the proximal-most point in slot 34.

Turning to FIG. 6, pivotal motion of plates 30, 32 relative to draw bar 12 is depicted. Transverse member 42 provides a pivot point for the pivotal motion. As shown, ball 38 may be positioned for optimal alignment with a ball-receiving cavity through a combination of axial and pivotal motions of plates 30, 32 relative to draw bar 12.

The above description sets forth certain preferred trailer hitch embodiments with reference to the appended figures. However, as will be apparent to one skilled in the art having read the foregoing disclosure, numerous changes, additions and/or modifications may be made to the embodiments described herein without departing from the spirit or scope of the present invention.

I claim:

1. A trailer hitch comprising:
   (a) a draw bar having a first end dimensioned and configured for receipt in a hitch receiver, the draw bar defining a longitudinal axis and including at least one pin-receiving aperture formed therein and wherein said draw bar further comprises an end opposite said first end, said opposite end being of rounded shape;
   (b) at least one plate movably mounted with respect to the draw bar, the plate including a locking aperture and a longitudinal slot;
   (c) an upwardly extending hitching ball mounted to the plate;
   (d) a tranverse member fixedly mounted with respect to the draw bar and extending through the longitudinal slot; and
   (e) a locking pin removably received by the pin-receiving aperture in the draw bar and the locking aperture in the plate.

2. A trailer hitch as described in claim 1, wherein the first end has a rectangular cross-section and includes a second pin-receiving aperture for facilitating attachment to a hitch receiver.

3. A trailer hitch as described in claim 1, wherein said transverse member and said longitudinal slot are adapted to permit both axial and pivotal motion of said at least one plate relative to said draw bar.

4. A trailer hitch as described in claim 1, wherein said draw bar includes a plurality of longitudinally aligned pin-receiving apertures.

5. A trailer hitch as described in claim 1, wherein the locking pin cooperates with a spring which biases the pin into the pin-receiving and locking apertures.

6. A trailer hitch comprising:
   (a) a draw bar having a first end dimensioned and configured for receipt in a hitch receiver, the draw bar defining a longitudinal axis and including at least one pin-receiving aperture formed therein;
   (b) at least one plate movably mounted with respect to the draw bar, the plate including a locking aperture and a longitudinal slot;
   (c) an upwardly extending hitching ball mounted to the plate;
   (d) a tranverse member fixedly mounted with respect to the draw bar and extending through the longitudinal slot; and
   (e) a locking pin removably received by the pin-receiving aperture in the draw bar and the locking aperture in the plate;
   wherein said plate and a second plate are mounted in parallel with respect to the draw bar, and said second plate includes a locking aperture and a longitudinal slot.

7. A trailer hitch as described in claim 6, wherein said two plates are connected by at least one torsion bar.

8. A trailer hitch comprising:
   (a) a draw bar having a first end dimensioned and configured for receipt in a hitch receiver, the draw bar defining a longitudinal axis and including at least one pin-receiving aperture formed therein;
   (b) at least one plate movably mounted with respect to the draw bar, the plate including a locking aperture and a longitudinal slot;
   (c) an upwardly extending hitching ball mounted to the plate;
   (d) a tranverse member fixedly mounted with respect to the draw bar and extending through the longitudinal slot;
   (e) a locking pin removably received by the pin-receiving aperture in the draw bar and the locking aperture in the plate; and
   at least one torsion bar mounted to said at least one plate.

9. A trailer hitch as described in claim 8, wherein said at least one torsion bar comprises two torsion bars mounted to said at least one plate, one of said torsion bars on each side of said longitudinal slot.

10. A trailer hitch as described in claim 9, further comprising a third torsion bar mounted to said at least one plate, said third torsion bar being oriented transverse to said longitudinal slot.

* * * * *